(12) United States Patent
Chen

(10) Patent No.: US 7,640,289 B2
(45) Date of Patent: *Dec. 29, 2009

(54) INTELLIGENT COMPUTER SWITCH

(75) Inventor: Sun-Chung Chen, Taipei (TW)

(73) Assignee: Aten International Co., Ltd., Shijr (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/046,606

(22) Filed: Mar. 12, 2008

(65) Prior Publication Data

US 2008/0155048 A1 Jun. 26, 2008

Related U.S. Application Data

(63) Continuation of application No. 10/244,532, filed on Sep. 17, 2002, now Pat. No. 7,386,584.

(30) Foreign Application Priority Data

Nov. 8, 2001 (TW) ............................. 90127798 A

(51) Int. Cl.
*G06F 15/16* (2006.01)

(52) U.S. Cl. ...................................... 709/200

(58) Field of Classification Search ................ 709/208, 709/244, 223; 710/62, 73; 345/168; 370/400–402
See application file for complete search history.

(56) References Cited

U.S. PATENT DOCUMENTS

| 5,499,377 | A | 3/1996 | Lee |
| 5,900,824 | A | 5/1999 | Hayashi |
| 6,388,658 | B1 | 5/2002 | Ahern et al. |
| 6,567,869 | B2 | 5/2003 | Shirley |
| 6,633,905 | B1 * | 10/2003 | Anderson et al. ........... 709/219 |
| 6,670,882 | B1 | 12/2003 | Bachar |
| 6,671,756 | B1 | 12/2003 | Thomas et al. |

OTHER PUBLICATIONS

IBM TDB, Detection of Connection Status for Devices in a Daisy Chain, May 6, 2001, pp. 1-2.*
Lightwave Communications, PC ServerSwitch 2x16 User Manual, Sep. 2001, Revision A.*
Belkin, The OmniView SE 2-Port User Manual, Sep. 2000, pp. 1-16.
Lightwave Communications, PC ServerSwitch 2x16 User Manual, Sep. 2001. Revision A.

* cited by examiner

*Primary Examiner*—Shawki S Ismail
*Assistant Examiner*—Grant Ford
(74) *Attorney, Agent, or Firm*—Chen Yoshimura LLP

(57) ABSTRACT

An intelligent computer switch is described. The intelligent computer switch has an automatic detection capacity to control a plurality of computers with at least one keyboard, at least one mouse and at least one monitor. The intelligent computer switch comprises an input port, a control device, an output port, and a plurality of computer connection ports. The input port receives input commands and data, and the output port sends output commands and data. While a series connection cable connected to the input port, the intelligent computer switch is determined to be a slave. While the series connection cable is not connected to the series connection cable, the intelligent computer switch is determined to be a master. The intelligent computer switch further comprises an on-screen display function and an authority-setting function with at least 4 sets of passwords for different users. Each slave generates a series number according to the sequence thereof and the master controls each slave according to the series number.

20 Claims, 3 Drawing Sheets

INTELLIGENT COMPUTER SWITCH

This application is a continuation of U.S. application Ser. No. 10/244,532, filed Sep. 17, 2002, now allowed, which is herein incorporated by reference in its entirety.

FIELD OF THE INVENTION

The present invention relates to an intelligent computer switch and especially to an intelligent computer switch with an auto detecting function and an auto adjusting function as a series connection sequence is changed.

BACKGROUND OF THE INVENTION

The wide proliferation of personal computers and networks allows people to utilize the networks to search for and provide information. Currently, network requests are higher, and network-related enterprises have to buy large numbers of computers and a lot of network equipment to satisfy user requests. For example, internet service providers and virtual host providers need to buy large numbers of server computers to rent to users. Because these providers may supply a fast network environment, a lot of companies are willing to rent their servers. The management and trouble shooting of these computers may become an important link. A larger server provider has thousands of server computers. Control of each of these computers requires a monitor, a keyboard and a mouse. Actually, each of these computers spends little time on the monitor, keyboard and mouse. Most of the time, the servers need no peripheral devices for control. Control of every computer with a set of these peripheral devices would incur high operation costs and is not necessary. Such peripheral devices also waste space. In resolution of these problems, a computer switch with a monitor, a keyboard and a mouse controls a plurality of server computers.

A compact type of the computer switch can connect at least two computers and switch between these computers. The quantities of the connection port are increased to connect more computers by way of one computer switch. However, this arrangement still cannot fulfill the requests of a larger computer company. Hence, a series connection computer switch is designed for a larger computer company. More computers can be controlled by the series connection computer switches with one set of peripheral devices, a monitor, a keyboard and a mouse. The series connection computer switches reduce the quantity of the peripheral devices. Series connection computer switches set their series number with dip switches, a type of mechanical switch. Therefore, every series connection computer switch must be set with its own series number before use. If a series number is duplicated or a computer switch is not functioning, the series numbers must be checked and reset. During this process, all server computers must wait for a new computer switch to be set and installed. This wastes time and delays business.

SUMMARY OF THE INVENTION

The series numbers of conventional computer switches are difficult to set and incorrect settings are difficult to find. There is therefor a need to have a computer switch that can automatically generated series number thereof and automatically arrange the connection sequence. In particular, if the series connection sequence is changed, the computer switches can automatically rearrange their series numbers and control by the new master computer switch.

The present invention discloses an intelligent computer switch with an automatic detection capacity to control a plurality of computers with one keyboard, one mouse and one monitor. The intelligent computer switch comprises an input port, a control device, an output port, and a plurality of computer connection ports.

The input port receives input commands and input data from other intelligent computer switches. The output port sends output commands and output data to another intelligent computer switch. The control device couples with the input port and the output port. While a series connection cable is connected to the input port, the control device sets the intelligent computer switch as a slave. While the series connection cable is not connected to the input port, the control device sets the intelligent computer switch as a master. The control device repeatedly detects a connection status of the input port. The plurality of computer connection ports couple with the control device and control the computers.

The intelligent computer switch comprises an on screen display function and an authority-setting function with at least 4 sets of passwords for different users. The master can control the slave and obtain data from the slave. Each slave generates a series number according to the quantity of intelligent computer switches before the slave and the master can control each slave according to the series number.

Another aspect of the present invention is an intelligent computer switch system to control a plurality of computers with at least one keyboard, at least one mouse and at least one monitor. The intelligent computer switch system comprises at least one series connection cable and a plurality of intelligent computer switches. The series connection cable couples an output port of one intelligent computer switch to the input port of other intelligent computer switches.

Therefore, the intelligent computer switch according to the present invention can detect and arrange the series connection sequence automatically. The master can obtain the data from the slaves immediately when the series connection sequence is changed or a new slave is added. The intelligent computer switch can control a plurality of server computers with only one set of peripheral devices. In particular, as the series connection sequence is changed, the intelligent computer switch may detect the master, determine the slave sequence, and the master can obtain information of all server computers immediately.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

Figure 1:
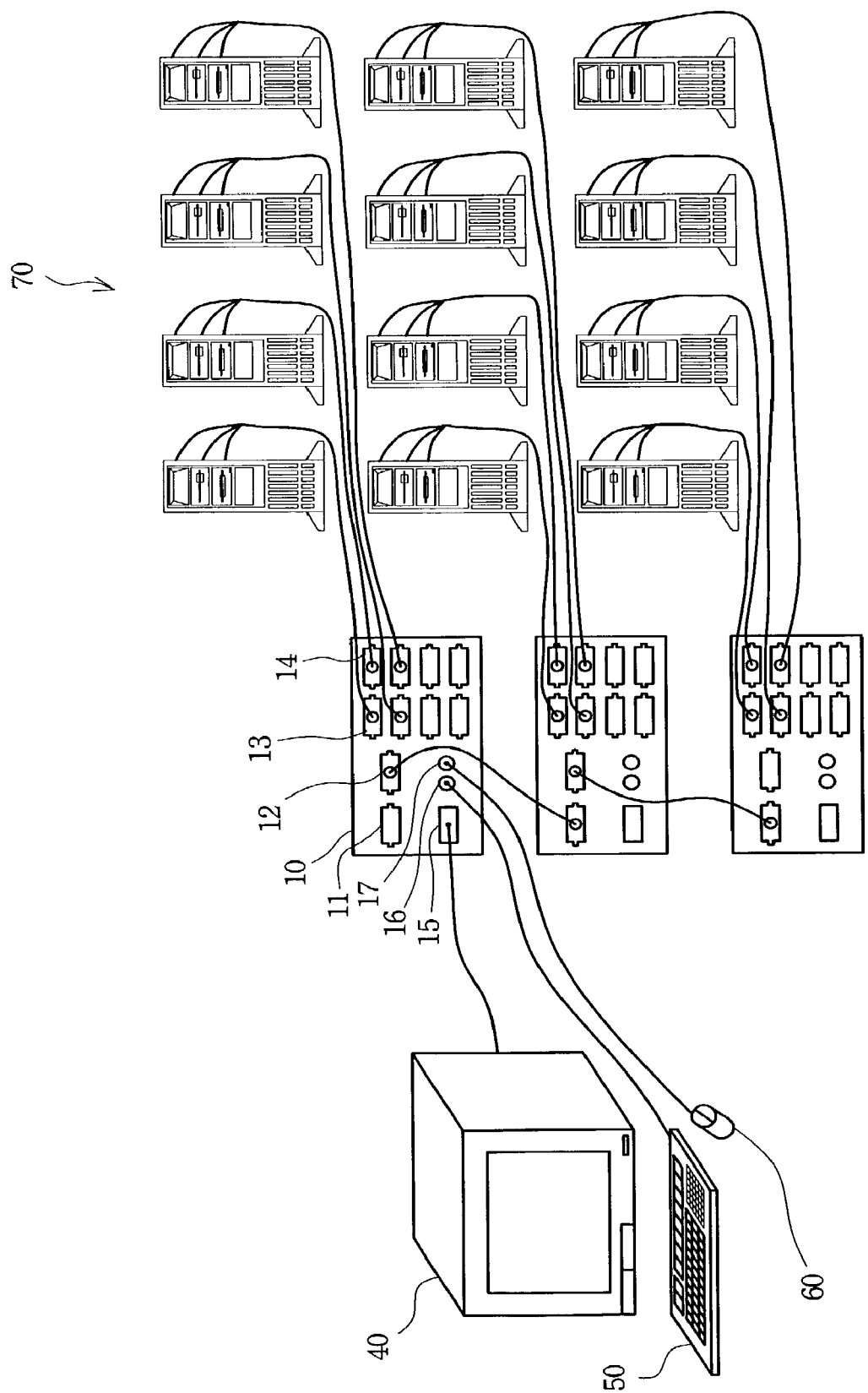
FIG. 1 is a schematic diagram of one embodiment according to the present invention, intelligent computer switches, connected with peripheral devices and server computers.

FIG. 1 is a schematic diagram of one embodiment according to the present invention, intelligent computer switches, connected with peripheral devices and server computers. In one embodiment, three intelligent computer switches 10 connect with a monitor 40, a keyboard 50, a mouse 60 and a plurality of server computers 70. Each intelligent computer switch 10 comprises an input port 11, an output port 12, a first connection port 13, a second connection port 14, a monitor connection port 15, a keyboard connection port 16, and a mouse connection port 17. The monitor connection port 15 connects with the monitor 40. The keyboard connection port 16 connects with the keyboard 50. The mouse connection port 17 connects with the mouse 60. The first connection port 13 and the second connection port 14 connect with the server computers 70. The output port 12 connects with the input port 11 of another intelligent computer switch 10. The intelligent computer switch 10 controls the server computers 70 with only one set of peripheral devices, the monitor 40, the keyboard 50, and the mouse 60. Each intelligent computer switch 10 can control about 2-16 server computers and can serially connect about 31 intelligent computer switches 10. That is to say, about 512 server computers can be controlled by one set of peripheral devices. It will be appreciated that the quantities of the controlled server computers and the serially connected intelligent computer switches are not limited to the quantities stated here.

Figure 2:
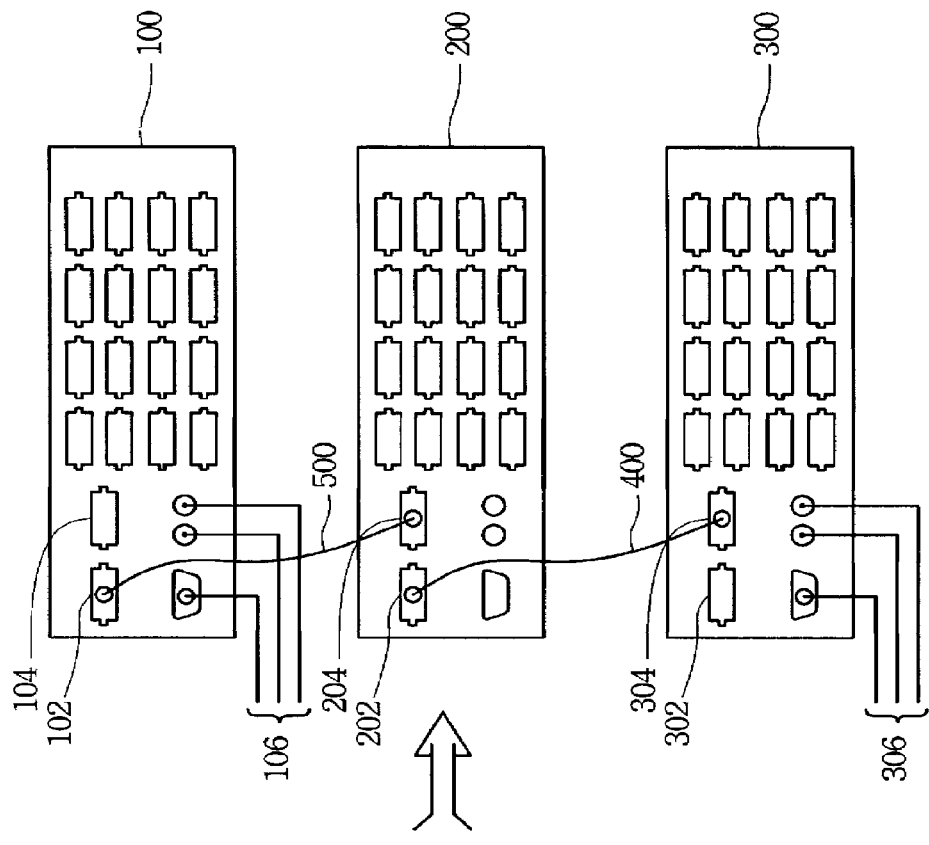
FIG. 2 is a schematic diagram to describe changing the series connection sequence of the intelligent computer switches according to the present invention when the status of series connection cables is changed.
Figure 2:
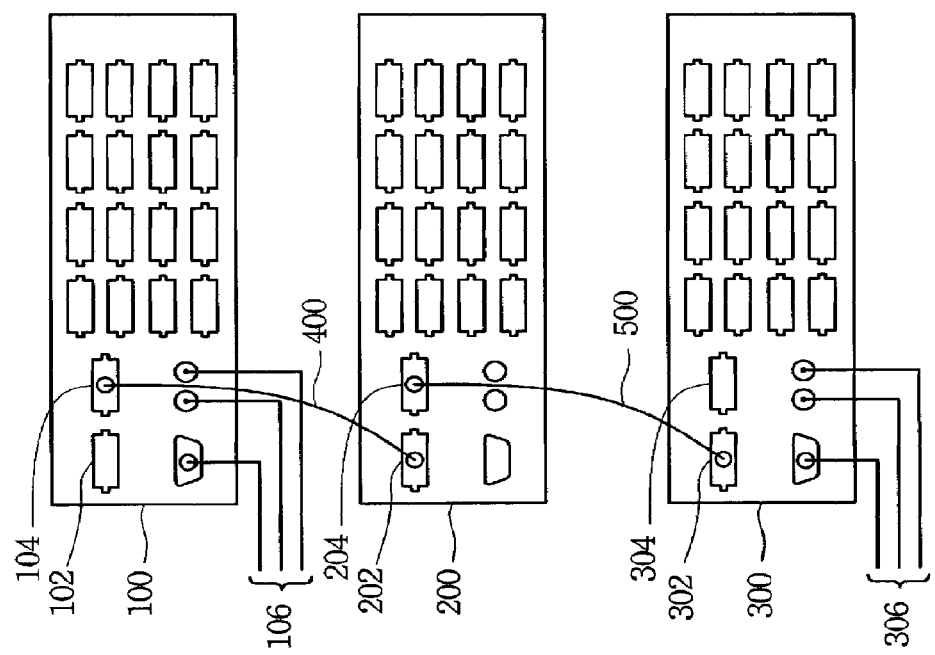

Referring to FIG. 2, a schematic diagram discloses that the series connection sequence of the intelligent computer switches according to the present invention is changed when the status of the series connection cables is changed. For example, three intelligent computer switches 100, 200 and 300 according to the present invention are connected by series connection cables 400 and 500. On the left side of the diagram, the series connection cable 400 connects an output port 104 of the intelligent computer switch 100 to an input port 202 of the intelligent computer switch 200, and the series connection cable 500 connects an output port 204 of the intelligent computer switch 200 to an input port 302 of the intelligent computer switch 300, simultaneously. The input port 202 obtains data and commands from the output port 104. The input port 302 obtains data and commands from the output port 204. The three intelligent computer switches 100, 200 and 300 are connected together serially. Each intelligent computer switch can control about 16 server computers, and the three intelligent computer switches 100, 200 and 300 can therefore control about 48 server computers. A set of peripheral devices 106, a monitor, a mouse and a keyboard, is connected to the intelligent computer switch 100. Therefore, the set of peripheral devices 106 controls the server computers connected to the three intelligent computer switches 100, 200 and 300. At this moment, the intelligent computer switch 100 is defined as a master, the intelligent computer switch 200 is defined as slave 1 and the intelligent computer switch 300 is defined as slave 2.

On the right side of the diagram, the connection status of the cables 400 and 500 is changed, and therefore the series connection sequence is changed. As the right side of the diagram shows, the cable 400 is connected to the output port 304 of the intelligent computer switch 300 instead of the output port 104 of the intelligent computer switch 100. Simultaneously, the cable 500 is connected to the input port 102 of the intelligent computer switch 100 instead of the input port 302 of the intelligent computer switch 300. At this moment, the intelligent computer switch 300 is defined as a master; the intelligent computer switch 100 is defined as slave 2 and the intelligent computer switch 200 is defined as slave 1. Therefore, the set of peripheral devices 306 connected to intelligent computer switch 300 controls the server computers connected to the three intelligent computer switches 100, 200 and 300. The intelligent computer switch detects the status of the input port and then a control device, such as a central processing unit or a programmable control unit, determines the intelligent computer switch to be a master or a slave.

The intelligent computer switch further has the function of on screen display (OSD). The OSD function can set at least names of the server computers and parameters of the intelligent computer switch more efficiently. As the data are set by the OSD function, the data are stored in a memory of the intelligent computer switch directly connected to the input computer and are transferred to the master. When the master is changed, the new master requests that slaves send their data to the new master. Therefore, the new master controls all server computers connected directly and indirectly thereto. This function saves a lot of time when the series connection sequence is changed. The network management can control all server computers immediately.

The intelligent computer switch detects status with a predetermined frequency. If the intelligent computer switches find the series connection sequence is changed, the intelligent computer switches confirm the new master. The important factor is whether or not the input port is connected to a series connection cable. If the input port is connected to a series connection cable, the intelligent computer switch is a slave. On the contrary, if the input port is not connected to a series connection cable, the intelligent computer switch is master. When the master is determined, the series numbers of the other intelligent computer switches are determined. The intelligent computer switch directly connected with the master is slave 1. The slave of the intelligent computer switch directly connecting with slave 1 is slave 2. Therefore, the series connection sequence is determined.

Figure 3:
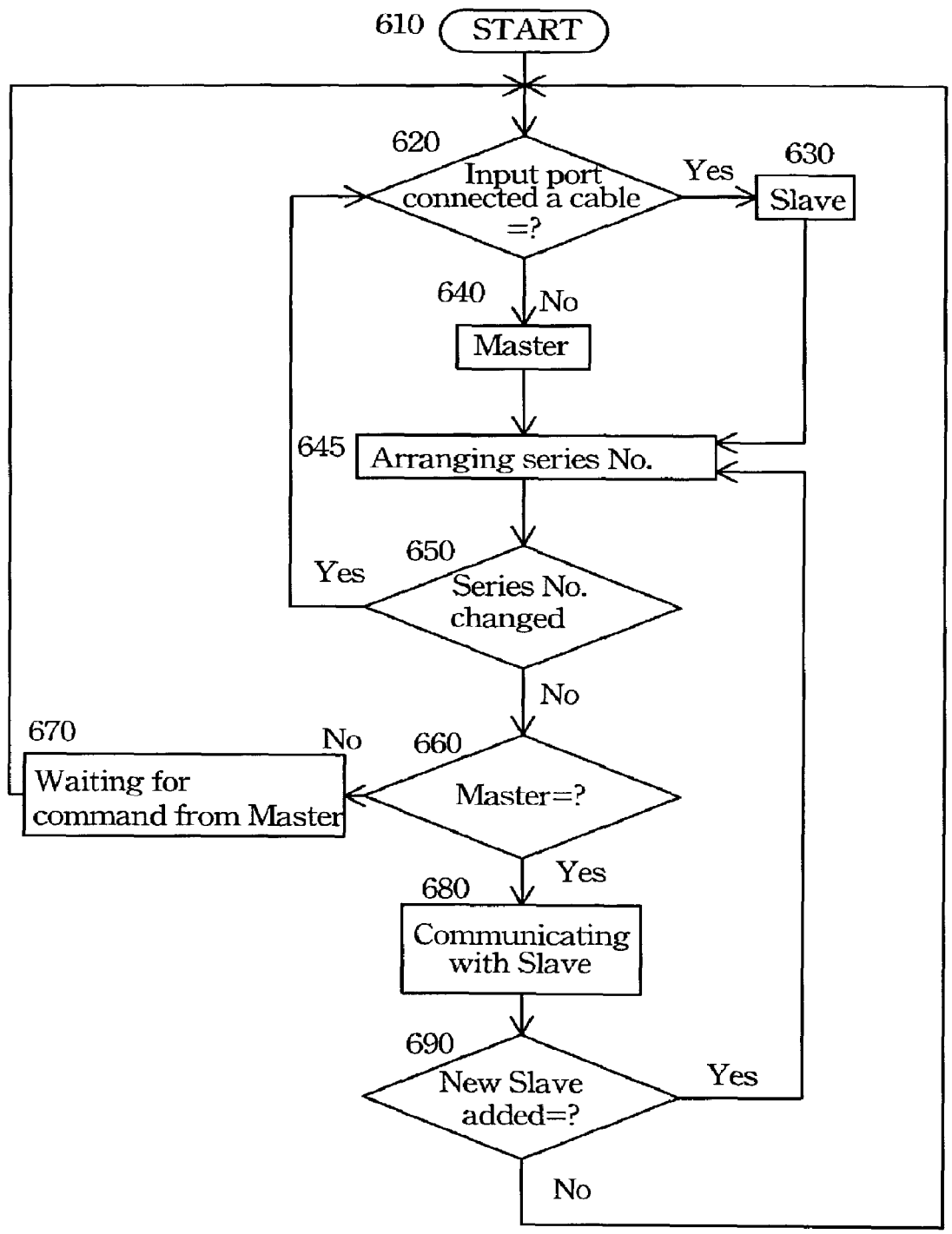
FIG. 3 is a flow chart to describe the work process of the intelligent computer switches according to the present invention.

Referring to FIG. 3, a flow chart discloses the work process of the intelligent computer switches according to the present invention. In step 610, the intelligent computer switch is turned on. In step 620, the intelligent computer switch detects whether or not a series connection cable is connected to the input port. If a series connection cable is connected to the input port, the process goes to step 630, the intelligent computer switch is identified as a slave, and then the process goes to step 645. If no series connection cable is connected to the input port, the process goes to step 640, the intelligent computer switch is determined as a master, and then the process goes to step 645. In step 645, the intelligent computer switches arrange their series connection sequence. The series number is about the quantity of the intelligent computer switch before this intelligent computer switch. 00 means a master, 01 means slave 1, 02 means slave 2, and so on.

Because the master is 00, slave 1 obtains information from the master, and then the slave 1 determines the series number thereof to be 01. By the same rule, slave 2 obtains information from slave 1 and slave 2 adds 1 to determine the series number thereof. In step 650, the intelligent computer switch detects whether or not the series connection sequence has changed. If the series connection sequence has changed, the process goes back to step 620. If the series connection sequence is unchanged, the process goes to step 660. Step 660 separates the intelligent computer in two ways: the first way is waiting for the master command for the slaves; the second way is communicating with the slaves to obtain the data in their memories for the master. In step 690, the master continues detecting whether or not any new slave has been added. Both master and slave go back to step 620 after a predetermined period to detect whether or not the series connection sequence has changed.

Due to the previous process, the intelligent computer switches according to the present invention can automatically detect and arrange the sequence thereof. The master can obtain the data from the slaves immediately when the series connection sequence is changed or a new slave is added. The intelligent computer switch according to the present invention can control a plurality of server computers with one set of the peripheral devices. In particular, as the series connection sequence is changed, the intelligent computer switch immediately detects the master, determines the slave sequence, and the master obtains information from all server computers. Furthermore, the intelligent computer switch according to the present invention has an OSD function to input the server computer information in the memory of the intelligent computer switch. When the intelligent computer switches are working, the master catches the data to control the server computers.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A computer switch comprising:
   a set of peripheral device ports for connecting to a set of peripheral devices;
   a first port;
   a second port;
   a control device coupled to the first port and the second port, the control device repeatedly detecting whether the first port is occupied to repeatedly determine a master or slave status of the computer switch, wherein
   if the first port is occupied, the control device determines the computer switch to be a slave and provides data to a first external computer switch connected to the first port, and
   if the first port is unoccupied, the control device determines the computer switch to be a master and controls a second external computer switch connected to the second port and obtains data from the second external computer switch; and
   a plurality of computer connection ports coupled to the control device for connecting to and controlling a plurality of computers, wherein the plurality of computers are controlled by the set of peripheral devices if the computer switch is determined to be a master, and are controlled by the first external computer switch connected to the first port if the computer switch is determined to be a slave.

2. The computer switch of claim 1, wherein if the control device determines the computer switch to be a slave, it configures a series number of the computer switch into a slave series number based on information regarding a series connection sequence received from the first port.

3. The computer switch of claim 1, wherein if the control device determines the computer switch to be a master, it configures a series number of the computer switch into a master series number.

4. The computer switch of claim 2, wherein the control device repeatedly detects the information regarding the series connection sequence from the first port and reconfigures its series number if the series connection sequence has changed.

5. The computer switch of claim 3, wherein the control device repeatedly detects information received from the second port to determine whether a new slave has been added.

6. A computer switch comprising:
   a set of peripheral device ports for connecting to a set of peripheral devices;
   a plurality of computer connection ports for connecting to a plurality of computers;
   a first port;
   a second port; and
   a control device coupled to the set of peripheral device ports, the computer connection ports, the first port and the second port, the control device repeatedly detecting whether the first port is occupied to repeatedly determine a master or slave status of the computer switch, wherein
   if the first port is occupied, the control device determines the computer switch to be a slave and communicates data and commands between the first port and the plurality of computer connection ports, and
   if the first port is unoccupied, the control device determines the computer switch to be a master and communicates data and commands between the set of peripheral device ports and the plurality of computer connection ports.

7. The computer switch of claim 6, wherein if the control device determines the computer switch to be a slave, it further communicates data and commands between the first port and the second port.

8. The computer switch of claim 6, wherein if the control device determines the computer switch to be a master, it further communicates data and commands between the set of peripheral device ports and the second port.

9. The computer switch of claim 6, wherein if the control device determines the computer switch to be a master, the computer switch controls a slave computer switch connected to the second port of the computer switch and obtains data from the slave computer switch.

10. The computer switch of claim 6, wherein if the control device determines the computer switch to be a slave, it configures a series number of the computer switch into a slave series number based on information regarding a series connection sequence received from the first port.

11. The computer switch of claim 6, wherein if the control device determines the computer switch to be a master, it configures a series number of the computer switch into a master series number.

12. The computer switch of claim 10, wherein the control device repeatedly detects the information regarding the series connection sequence from the first port and reconfigures its series number if the series connection sequence has changed.

13. The computer switch of claim 11, wherein the control device repeatedly detects information received from the second port to determine whether a new slave is added.

14. A method executed by a computer switch, the computer switch having a set of peripheral device ports for connecting to a set of peripheral devices, a plurality of computer connection ports for connecting to a plurality of computers, a first port, and a second port, the method comprising:
   repeatedly detecting whether the first port is occupied to repeatedly determine a master or slave status of the computer switch;
   if the first port is occupied, determining the computer switch to be a slave and communicating data and commands between the first port and the plurality of computer connection ports; and
   if the first port is unoccupied, determining the computer switch to be a master and communicating data and commands between the set of peripheral device ports and the plurality of computer connection ports.

15. The method of claim 14, further comprising:

if the computer switch is determined to be a slave, communicating data and commands between the first port and the second port.

16. The method claim 14, further comprising:

if the computer switch is determined to be a master, communicating data and commands between the set of peripheral device ports and the second port.

17. The method of claim 14, further comprising:

if the computer switch is determined to be a slave, configuring a series number of the computer switch into a slave series number based on information regarding a series connection sequence received from the first port.

18. The method of claim 14, further comprising:

if the computer switch is determined to be a master, configuring a series number of the computer switch into a master series number.

19. The method of claim 17, further comprising:

repeatedly detecting the information regarding the series connection sequence from the first port and reconfiguring the series number if the series connection sequence has changed.

20. The method of claim 18, further comprising:

repeatedly detecting information received from the second port to determine whether a new slave has been added.

\* \* \* \* \*